(12) United States Patent
Semenov et al.

(10) Patent No.: US 11,597,391 B2
(45) Date of Patent: Mar. 7, 2023

(54) ONE-PEDAL DRIVE SYSTEM FOR A VEHICLE

(71) Applicant: FORD GLOBAL TECHNOLOGIES, LLC, Dearborn, MI (US)

(72) Inventors: Sergey Gennadievich Semenov, Farmington Hills, MI (US); Jonathan Andrew Butcher, Farmington, MI (US); Bryan Michael Bolger, Canton, MI (US); Brandon Jay Woodland, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 17/035,086

(22) Filed: Sep. 28, 2020

(65) Prior Publication Data

US 2022/0097701 A1   Mar. 31, 2022

(51) Int. Cl.
*B60W 10/08*    (2006.01)
*B60W 10/18*    (2012.01)
(Continued)

(52) U.S. Cl.
CPC ............. *B60W 30/188* (2013.01); *B60K 1/00* (2013.01); *B60K 17/04* (2013.01); *B60K 23/00* (2013.01); *B60K 26/02* (2013.01); *B60L 7/10* (2013.01); *B60L 15/20* (2013.01); *B60W 10/08* (2013.01); *B60W 10/18* (2013.01);
(Continued)

(58) Field of Classification Search
CPC .... B60W 30/188; B60W 10/08; B60W 10/18; B60W 2520/10; B60W 2520/16; B60W 2540/10; B60K 1/00; B60K 17/04; B60K 23/00; B60K 26/02; B60K 2026/025; B60K 2026/026; B60L 7/10; B60L 15/20; B60Y 2200/91; B60Y 2200/92; B60Y 2300/24; B60Y 2300/60; B60Y 2300/70
See application file for complete search history.

(56) References Cited

U.S. PATENT DOCUMENTS 6,953,415 B2 * 10/2005 Kadota ................. B60W 10/08
                                                                180/65.225
10,005,375 B2    6/2018 Yamazaki et al.
(Continued)

FOREIGN PATENT DOCUMENTS

CN   110385997 A      10/2019
JP   2016107822 A  *  6/2016   ............ B60W 10/08

*Primary Examiner* — Tisha D Lewis
(74) *Attorney, Agent, or Firm* — David B Kelley; Brooks Kushman P.C.

(57) ABSTRACT

A vehicle includes an accelerator pedal, an electric machine, and a controller. The electric machine is configured to propel and brake the vehicle according to a one-pedal driving operation. The controller is programmed to, in response to depressing the accelerator pedal, command a desired torque to the electric machine. The controller is further programmed to, adjust the desired torque based on a gradient of a road surface that the vehicle is positioned on. The controller is further programmed to, in response to movement of the electric machine in a direction that is opposite to a desired direction while the adjusted desired torque is being applied, increase the adjusted desired torque by a compensation torque such that movement of the electric machine transitions to the desired direction.

18 Claims, 4 Drawing Sheets

(51) Int. Cl.
*B60W 30/188* (2012.01)
*B60L 15/20* (2006.01)
*B60K 26/02* (2006.01)
*B60L 7/10* (2006.01)
*B60K 17/04* (2006.01)
*B60K 23/00* (2006.01)
*B60K 1/00* (2006.01)

(52) U.S. Cl.
CPC .. *B60K 2026/025* (2013.01); *B60K 2026/026* (2013.01); *B60W 2520/10* (2013.01); *B60W 2520/16* (2013.01); *B60W 2540/10* (2013.01); *B60Y 2200/91* (2013.01); *B60Y 2200/92* (2013.01); *B60Y 2300/24* (2013.01); *B60Y 2300/60* (2013.01); *B60Y 2300/70* (2013.01)

(56) References Cited

U.S. PATENT DOCUMENTS

| | | | |
|---|---|---|---|
| 10,099,575 B2 | 10/2018 | Yamazaki et al. | |
| 10,369,888 B2 | 8/2019 | Kuang et al. | |
| 2009/0112386 A1* | 4/2009 | Saitoh | B60L 58/40 |
| | | | 701/22 |
| 2019/0106103 A1 | 4/2019 | Inoue et al. | |
| 2020/0094683 A1* | 3/2020 | Rotilli Filho | B60L 15/2009 |
| 2022/0080971 A1* | 3/2022 | Bolger | B60W 30/182 |

\* cited by examiner

US 11,597,391 B2

ONE-PEDAL DRIVE SYSTEM FOR A VEHICLE

TECHNICAL FIELD

The present disclosure relates to hybrid/electric vehicles and one-pedal drive systems for hybrid/electric vehicles.

BACKGROUND

Hybrid/electric vehicles may include one-pedal drive systems that are configured to brake the vehicle in response to releasing the accelerator pedal and without application of the brake pedal.

SUMMARY

A vehicle includes an accelerator pedal, a brake pedal, an electric machine, friction brakes, and a controller. The electric machine has a rotor, is configured to propel the vehicle in response to depressing the accelerator pedal, and is configured to brake the vehicle via regenerative braking in response to releasing the accelerator pedal without application of the brake pedal according to a one-pedal driving operation. The friction brakes are configured to brake the vehicle in response to depressing the brake pedal and to maintain a stopped position of the vehicle without depressing the accelerator pedal or the brake pedal according to the one-pedal driving operation. The controller is programmed to, in response to depressing the accelerator pedal while in the stopped position, release the friction brakes and command a desired torque to the electric machine. The controller is further programmed to, adjust the desired torque based on a gradient of a road surface that the vehicle is positioned on. The controller is further programmed to, in response to movement of the rotor from a baseline position and in a direction that is opposite to a desired direction while the adjusted desired torque is being applied, increase the adjusted desired torque by a compensation torque such that movement of the rotor transitions to the desired direction.

A vehicle includes an accelerator pedal, an electric machine, and a controller. The electric machine is configured to propel and brake the vehicle according to a one-pedal driving operation. The controller is programmed to, in response to depressing the accelerator pedal, command a desired torque to the electric machine. The controller is further programmed to, adjust the desired torque based on a gradient of a road surface that the vehicle is positioned on. The controller is further programmed to, in response to movement of the electric machine in a direction that is opposite to a desired direction while the adjusted desired torque is being applied, increase the adjusted desired torque by a compensation torque such that movement of the electric machine transitions to the desired direction.

A vehicle includes an accelerator pedal, an electric machine, friction brakes, and a controller. The electric machine is configured to propel the vehicle in response to depressing the accelerator pedal and is configured to brake the vehicle in response to releasing the accelerator pedal according to a one-pedal driving operation. The friction brakes are configured to maintain a stopped position of the vehicle. The controller is programmed to, in response to depressing the accelerator pedal while in the stopped position, release the friction brakes and command a desired torque to the electric machine. The controller is further programmed to, in response to a detected pitch of the vehicle, adjust the desired torque to compensate for the detected pitch. The controller is further programmed to, in response to movement of the electric machine from a baseline position and in a direction that is opposite to a desired direction while the adjusted desired torque is being applied, which is indicative of a difference between an actual pitch of the vehicle and the detected pitch, increase the adjusted desired torque by a compensation torque such that movement of the electric machine transitions to the desired direction.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
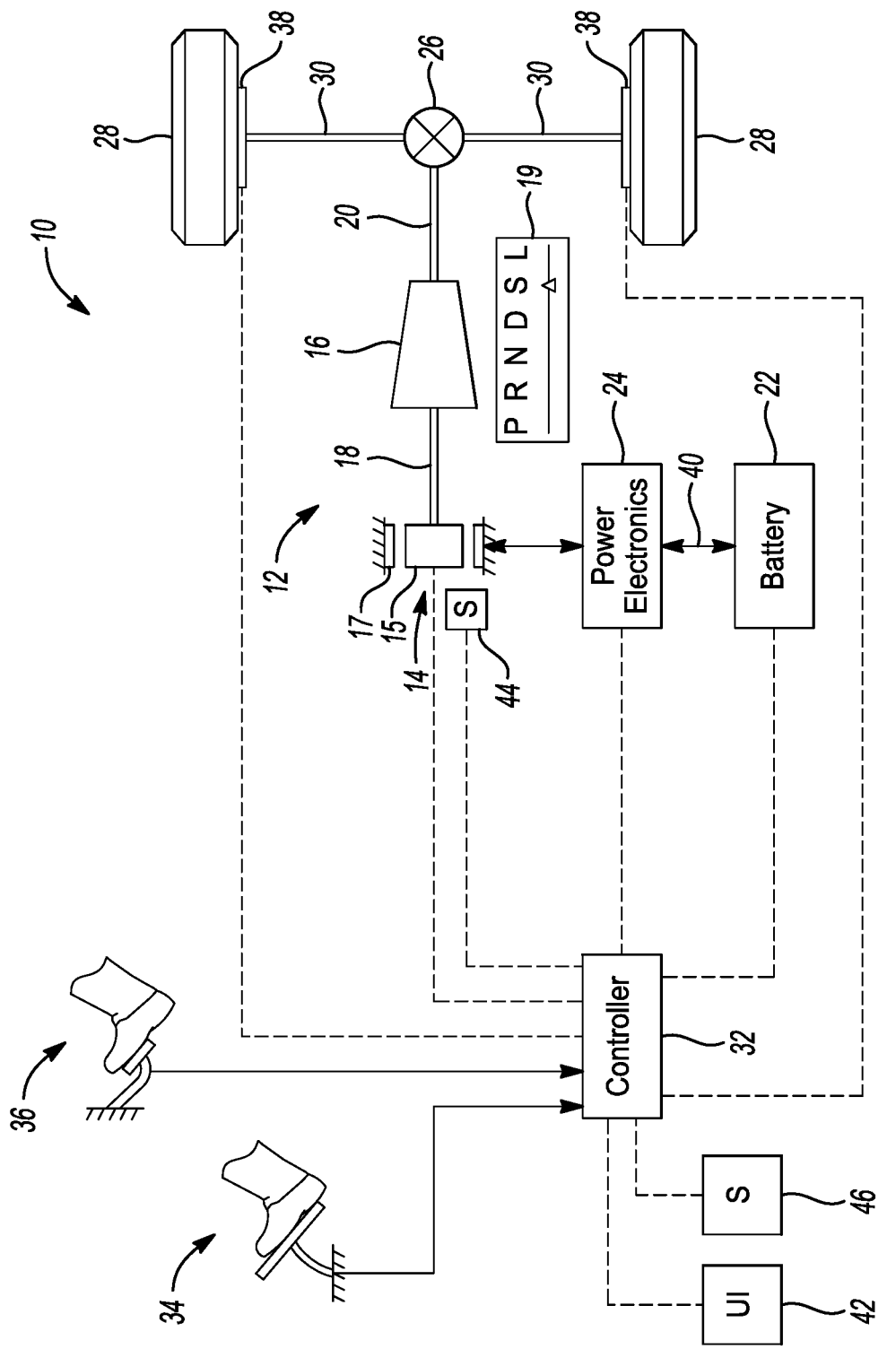
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. The M/G 14 may include a rotor 15 and a stator 17. More specifically, the M/G 14 may be rotatably connected to an input shaft 18 of the transmission 16. The transmission 16 may be placed in PRNDSL (park, reverse, neutral, drive, sport, low) via a transmission range or gear selector 19. The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The M/G 14 is configured to deliver power to the wheels 28 to drive the vehicle 28 via the various connections described above. It should be understood that the connections between the M/G 14 and the wheels 28 described herein is for illustrative purposes only and that other drivetrain configurations between the M/G 14 and the wheels 28 may be implemented in the alternative.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. Stated in other terms, increasing an amount of depression of the accelerator pedal is configured to generate a command to increase the speed of the vehicle 10 while decreasing an amount of depression of the accelerator pedal is configured to generate a command to decrease the speed of the vehicle 10. A brake pedal 36 is also used by the driver of the vehicle to provide a demanded braking torque to slow or decrease the speed of the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The friction brakes 38 are configured to apply torque to the wheels in response to depression of the brake pedal 36 in order to slow or brake the vehicle 10. The controller 32 also controls the timing of gear shifts within the transmission 16.

The M/G 14 may act as a motor and provide a driving force for the powertrain 12. To drive or propel the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22. Regenerative braking also results in slowing or braking the vehicle.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The M/G 14 may include a motor position sensor 44, such as a resolver, that is configured to communicate the position of the motor, or more specifically the position of the rotor 15, to the controller 32. The vehicle 10 may include a sensor 46, such as an accelerometer, that is configured to determine a gradient of a road surface that the vehicle 10 is positioned on. More specifically, the sensor 46 may be configured to detect a pitch angle of the vehicle 10. The sensor 46 may be configured to communicate the road gradient and/or pitch angle of the vehicle 10 to the controller 32.

The vehicle 10 may include a one-pedal drive mode or system. In the one-pedal drive mode, the speed of the vehicle may be increased via the M/G 14 (or any other powerplant if a hybrid vehicle) in response to increasing a depressed position of the accelerator pedal 34 while releasing the accelerator pedal 34 results in braking the vehicle 10 via regenerative braking through the M/G 14 or via the friction brakes 38. More specifically, the vehicle 10 may be slowed or braked via releasing the accelerator pedal 34 alone without an application or depression of the brake pedal 36. Once the vehicle has arrived at a stopped or stationary position, the friction brakes 38 may be configured to apply torque to maintain or hold the stopped or stationary position of the vehicle without depressing the accelerator pedal and/or without depressing the brake pedal 36 according to the one-pedal driving operation.

Figure 2:
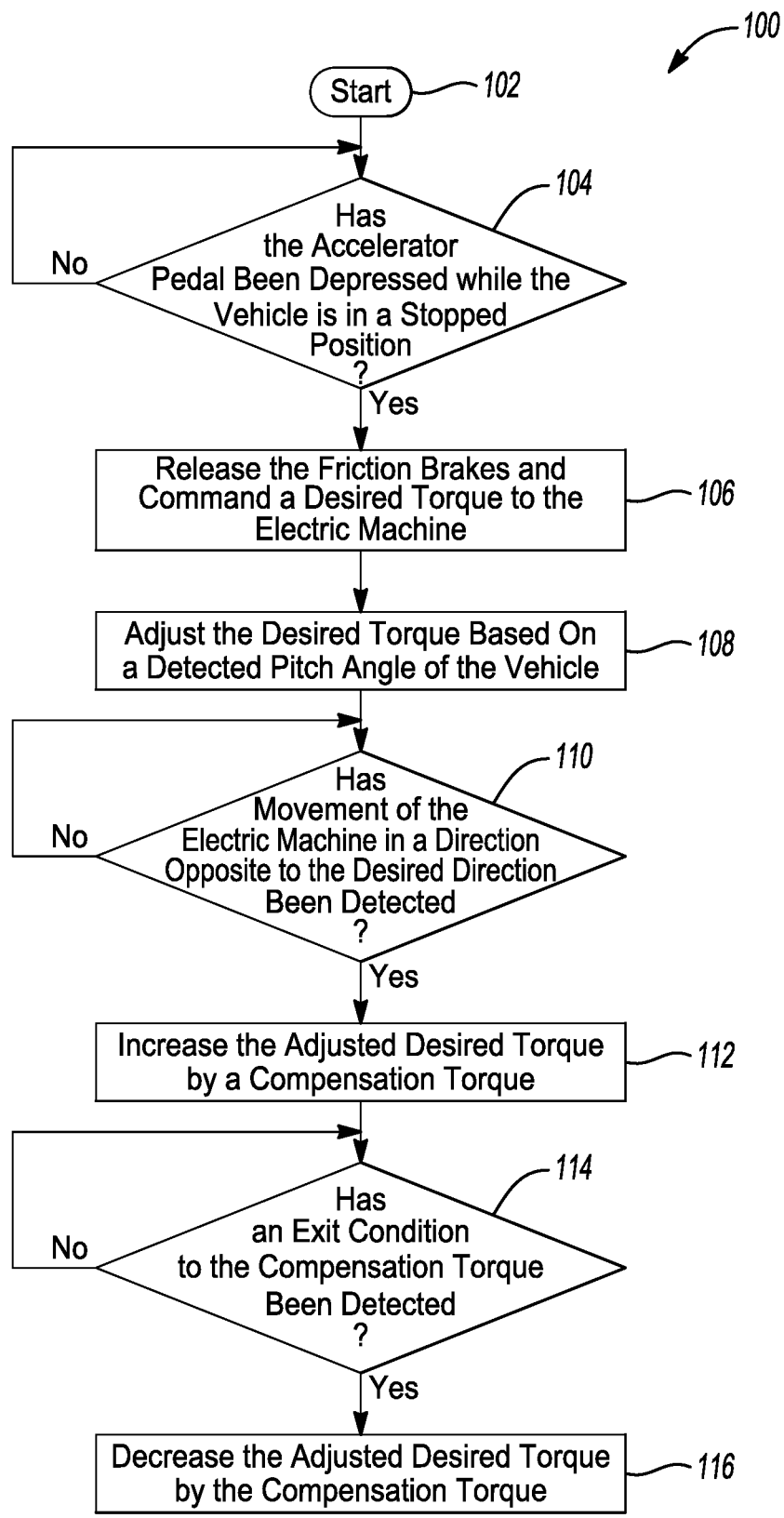
FIG. 2 is a flowchart illustrating a method for controlling torque according a one-pedal drive system in a hybrid/electric vehicle.
Figure 3:
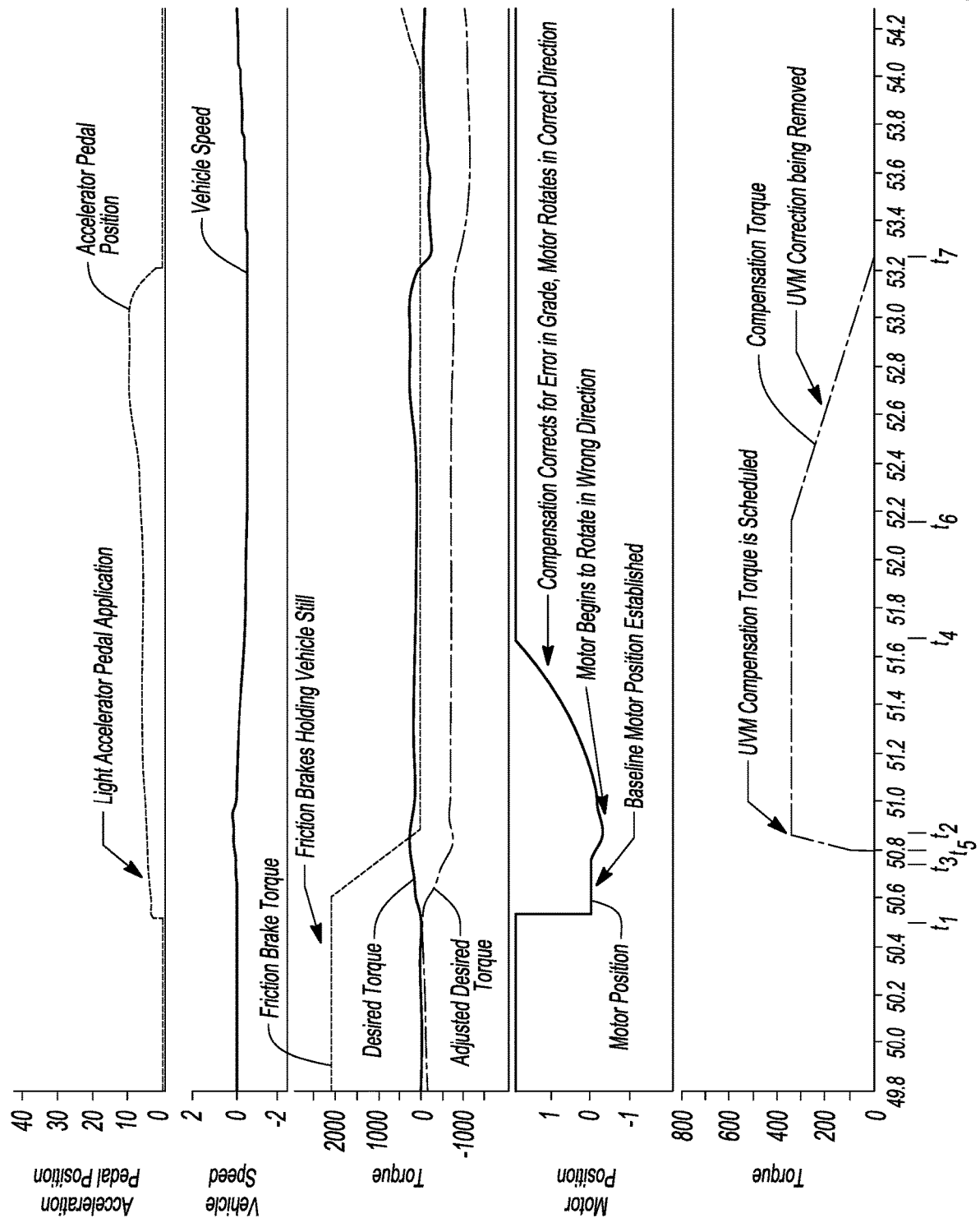
FIG. 3 is a series of graphs illustrating an accelerator pedal position, various torque values, a motor position, and vehicle speed during a launch of the vehicle while implementing the method of FIG. 2.
Figure 4:
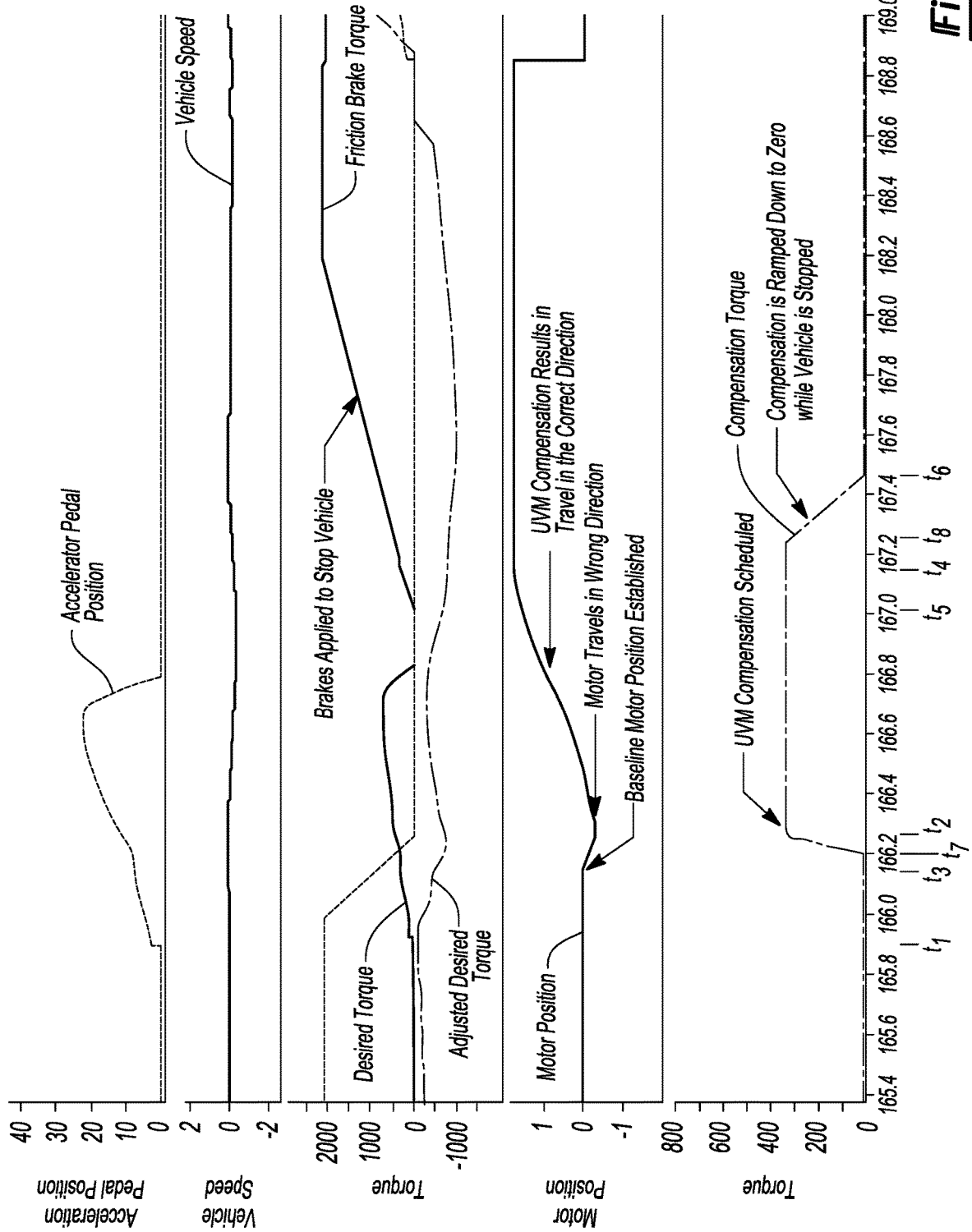
FIG. 4 is a series of graphs illustrating an accelerator pedal position, various torque values, a motor position, and vehicle speed during a launch of the vehicle and during a braking scenario after a launch of the vehicle while implementing the method of FIG. 2.

Referring to FIGS. 2, 3, and 4, a flowchart of a method 100 for controlling torque according to a one-pedal drive system, a first series of graphs including various vehicle parameters during a launch of the vehicle while implementing the method 100, and a second series of graphs including the various vehicle parameters during a braking scenario after a launch of the vehicle while implementing the method 100 are illustrated, respectively. The method 100 may be stored as control logic and/or an algorithm within the controller 32. The controller 32 may implement the method 100 by controlling the various components of the vehicle 10.

The method 100 is initiated at start block 102. The method 100 may be initiated at start block 102 by turning a start key or ignition of the vehicle 10 to an "on" position. The method 100 then moves on to block 104 where it is determined if the accelerator pedal 34 has been depressed while the vehicle 10 is in a stopped or stationary position. If the answer at block 104 is NO, the method 100 recycles back to the beginning of block 104. If the answer at block 104 is YES, the method 100 moves on to block 106, where the friction brakes 38 are released and a desired torque is commanded to the electric machine (e.g., M/G 14). The method 100 then moves on to block 108 where the desired torque commanded to the electric machine is adjusted based on a gradient of a road surface that the vehicle 10 is positioned on. More specifically at block 108, the sensor 46 may detect a pitch angle of the vehicle 10 due to the road gradient and the desired torque commanded to the electric machine may be adjusted based on the detected pitch angle of the vehicle 10.

Such a scenario where depressing the accelerator pedal 34, while the vehicle 10 is in a stopped or stationary position, results in releasing the friction brakes (i.e., reducing the torque of the friction brakes from a hold value to zero) and in commanding a desired torque to the electric machine (which is then adjusted based on the gradient of the road surface the vehicle is positioned on or based on the pitch angle of the vehicle) is illustrated between times $t_1$ and $t_2$ in FIGS. 3 and 4. It should be noted that the adjusted desired torque in FIGS. 3 and 4 may include torque adjustments of the desired torque (which may be an accelerator pedal commanded torque) to compensate for any requested braking torque, a compensation torque according to an unintended vehicle motion mitigation strategy (discussed further below), or any adjust necessary torque adjustment strategy that is in addition to any torque adjustment to account for the pitch angle of the vehicle 10.

The method 100 next moves on to block 110, where it is determined if movement of the electric machine (e.g., the M/G 14 or more specifically the rotor 15 of the M/G 14) from a baseline position and in a direction that is opposite to a desired direction while the adjusted desired torque is being applied has been detected. If the answer at block 110 is NO, the method 100 recycles back to the beginning of block 110. If the answer at block 110 is YES, the method 100 moves on to block 112, where the adjusted desired torque is increased by a compensation torque such that movement of the electric machine (or more specifically movement or rotation of the rotor 15) transitions to the desired direction. The compensation torque may also be configured to adjust the position of the electric machine (or more specifically the position of the rotor 15) in the desired direction to a position that corresponds to the baseline position plus a hysteresis value to reduce the effect of the noise in the motor position. Adjusting the position of the electric machine (or more specifically the position of the rotor 15) in the desired direction to a position that corresponds to the baseline position plus a hysteresis value is shown in FIGS. 3 and 4 to occur between times $t_3$ and $t_4$.

One-pedal drive systems may use a feedforward torque application to estimate how much torque is needed to compensate for the road grade the vehicle is on. If this estimation is incorrect, it can result in too positive or too negative of a torque application at the wheels in the direction of the selected gear. As an example, if the torque estimation is too negative in a forward gear it can result in low acceleration but continued movement in reverse direction which constitutes an unintended vehicle movement. Such movement in a direction that is opposite to a desired direction may be indicative of the vehicle being on split grades where the overall pitch of the vehicle does not match a localized grade under the front and/or rear wheels or may be indicative of an incorrect estimation of the vehicle pitch (e.g., there may be a difference between an actual vehicle pitch and the pitch detected by sensor 46 due to some error). The compensation torque is part of the unintended vehicle motion (UVM) mitigation strategy to prevent such unintended movement of the electric machine and potentially the vehicle 10 in a direction that is opposite to a desired direction. The compensation torque may also be referred to as the UVM compensation torque. The compensation torque is set large enough to overcome the maximum amount of error possible in the feedforward term for very small vehicle movements.

The baseline position of the electric machine (or more specifically the rotor 15) may correspond to a position of the electric machine (or more specifically the rotor 15) at a predetermined time period after depressing the accelerator pedal 34 while in the stopped position or may correspond to a position of the electric machine (or more specifically the rotor 15) that coincides with the adjusted desired torque exceeding a threshold torque after depressing the accelerator pedal while in the stopped position. The predetermined time period may be calibrated to a short period time so that if the adjusted desired torque stays below the threshold torque, the baseline motor position will still be established. Without such a predetermined time period, it may be possible on a sufficiently shallow grade to achieve unintended vehicle movement against the gear direction at a torque level below the threshold torque. The threshold torque may correspond to a torque required to overcome lash between the electric machine (e.g., M/G 14) and the drive wheels (e.g., wheels 28). Establishment of such a baseline position is shown in FIGS. 3 and 4 at or before time $t_3$.

The method 100 next moves on to block 114, where it is determined if an exit condition to the compensation torque has been detected. If the answer at block 114 is NO, the method 100 recycles back to the beginning of block 114. If the answer at block 114 is YES, the method 100 moves on to block 116, where the adjusted desired torque is decreased by a compensation torque (i.e., the compensation torque is blended or phased out of the adjusted desired torque). The exit conditions may include: (1) the electric machine (or more specifically, the rotor 15) rotating a threshold number of revolutions in the desired direction beyond the baseline position after increasing the adjusted desired torque by the compensation torque; (2) braking the vehicle 10 to a stop after increasing the adjusted desired torque by the compensation torque (see FIG. 4 between times $t_5$ and $t_6$); and/or (3) changing a position of the gear selector 19 after increasing the adjusted desired torque by the compensation torque.

This compensation torque may be scheduled using calibratable filters and rate limits to allow a quick response time. Another calibration table schedules how the compensation torque is removed as a function of positive motor rotation (i.e., exit condition 1 listed above). These tables may be calibrated so that the vehicle 10 must travel a specified distance in the correct direction before any compensation is removed. Additional calibration tables may be used to schedule how the compensation torque is removed once any of the exit conditions listed above are detected. Each exit condition may include different calibration tables. For example, the compensation torque may be ramped down or blended out at a faster rate in response to braking the vehicle 10 (i.e., exit condition 2 listed above) when compared to how fast the compensation torque is ramped down or blended out in response to the electric machine (or more specifically, the rotor 15) rotating a threshold number of revolutions in the desired direction beyond the baseline position (i.e., exit condition 2 listed above).

The adjusted desired torque may be increased by the compensation torque at a first rate (See FIG. 3 between times $t_5$ and $t_2$, and FIG. 4 between times $t_7$ and $t_2$) and decreased by the compensation torque at a second rate (See FIG. 3 between times $t_6$ and $t_7$, and FIG. 4 between times $t_8$ and $t_6$). The absolute value of the first rate may be greater than an absolute value of the second rate.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

It should be understood that the designations of first, second, third, fourth, etc. for any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an accelerator pedal;
a brake pedal;
an electric machine having a rotor, configured to propel the vehicle in response to depressing the accelerator pedal, and configured to brake the vehicle via regenerative braking in response to releasing the accelerator pedal without application of the brake pedal according to a one-pedal driving operation;
friction brakes configured to brake the vehicle in response to depressing the brake pedal and to maintain a stopped position of the vehicle without depressing the accelerator pedal or the brake pedal according to the one-pedal driving operation; and
a controller programmed to,
in response to depressing the accelerator pedal while in the stopped position, release the friction brakes and command a desired torque to the electric machine,
adjust the desired torque based on a gradient of a road surface that the vehicle is positioned on,
in response to movement of the rotor from a baseline position and in a direction that is opposite to a desired direction while the adjusted desired torque is being applied, increase the adjusted desired torque by a compensation torque such that movement of the rotor transitions to the desired direction, and
in response to braking the vehicle to a stop after increasing the adjusted desired torque by the compensation torque, decrease the adjusted desired torque by the compensation torque.

2. The vehicle of claim 1, wherein the baseline position corresponds to a position of the rotor at a predetermined time period after depressing the accelerator pedal while in the stopped position.

3. The vehicle of claim 1, wherein the baseline position corresponds to a position of the rotor that coincides with the adjusted desired torque exceeding a threshold torque after depressing the accelerator pedal while in the stopped position.

4. The vehicle of claim 3 further comprising drive wheels and, wherein the threshold torque corresponds to a torque required to overcome lash between the electric machine and the drive wheels.

5. The vehicle of claim 1, wherein the compensation torque is configured to adjust the position of the rotor in the desired direction to a position that corresponds to the baseline position plus a hysteresis value.

6. The vehicle of claim 1, wherein the controller is further programmed to, in response to the rotor rotating a threshold number of revolutions in the desired direction beyond the baseline position after increasing the adjusted desired torque by the compensation torque, decrease the adjusted desired torque by the compensation torque.

7. The vehicle of claim 6, wherein the controller is further programmed to, increase the adjusted desired torque by the compensation torque at a first rate and decrease the adjusted desired torque by the compensation torque at a second rate, wherein an absolute value of the first rate is greater than an absolute value of the second rate.

8. The vehicle of claim 1 further comprising drive wheels and a transmission having a gear selector, wherein the transmission is disposed between the electric machine and the drive wheels, and wherein the controller is further programmed to, in response to changing a position of the gear selector after increasing the adjusted desired torque by the compensation torque, decrease the adjusted desired torque by the compensation torque.

9. A vehicle comprising:
an accelerator pedal;
an electric machine configured to propel and brake the vehicle according to a one-pedal driving operation; and
a controller programmed to,
in response to depressing the accelerator pedal, command a desired torque to the electric machine,
adjust the desired torque based on a gradient of a road surface that the vehicle is positioned on, and
in response to movement of the electric machine in a direction that is opposite to a desired direction while the adjusted desired torque is being applied, increase the adjusted desired torque by a compensation torque such that movement of the electric machine transitions to the desired direction, wherein the compensation torque is configured to adjust the position of the electric machine in the desired direction to a baseline position plus a hysteresis value.

10. The vehicle of claim 9, wherein the baseline position corresponds to a position of the electric machine at a predetermined time period after depressing the accelerator pedal while in the stopped position.

11. The vehicle of claim 9, wherein the baseline position corresponds to a position of the electric machine that coincides with the adjusted desired torque exceeding a threshold torque after depressing the accelerator pedal while in the stopped position.

12. The vehicle of claim 9, wherein the controller is further programmed to, in response to the electric machine rotating a threshold number of revolutions in the desired direction beyond the baseline position after increasing the adjusted desired torque by the compensation torque, decrease the adjusted desired torque by the compensation torque.

13. The vehicle of claim 12, wherein the controller is further programmed to, increase the adjusted desired torque by the compensation torque at a first rate and decrease the adjusted desired torque by the compensation torque at a second rate, wherein an absolute value of the first rate is greater than an absolute value of the second rate.

14. A vehicle comprising:
an accelerator pedal;
an electric machine configured to propel the vehicle in response to depressing the accelerator pedal and configured to brake the vehicle in response to releasing the accelerator pedal according to a one-pedal driving operation;
friction brakes configured to maintain a stopped position of the vehicle; and
a controller programmed to,
in response to depressing the accelerator pedal while in the stopped position, release the friction brakes and command a desired torque to the electric machine,
in response to a detected pitch of the vehicle, adjust the desired torque to compensate for the detected pitch, and
in response to movement of the electric machine from a baseline position and in a direction that is opposite to a desired direction while the adjusted desired torque is being applied, which is indicative of a difference between an actual pitch of the vehicle and the detected pitch, increase the adjusted desired torque by a compensation torque such that movement of the electric machine transitions to the desired direction.

15. The vehicle of claim 14, wherein the controller is further programmed to, in response to the electric machine rotating a threshold number of revolutions in the desired direction beyond the baseline position after increasing the adjusted desired torque by the compensation torque, decrease the adjusted desired torque by the compensation torque.

16. The vehicle of claim 15, wherein the controller is further programmed to, increase the adjusted desired torque by the compensation torque at a first rate and decrease the adjusted desired torque by the compensation torque at a second rate, wherein an absolute value of the first rate is greater than an absolute value of the second rate.

17. The vehicle of claim 14, wherein the controller is further programmed to, in response to braking the vehicle to a stop after increasing the adjusted desired torque by the compensation torque, decrease the adjusted desired torque by the compensation torque.

18. The vehicle of claim 14 further comprising drive wheels and a transmission having a gear selector, wherein the transmission is disposed between the electric machine and the drive wheels, and wherein the controller is further programmed to, in response to changing a position of the gear selector after increasing the adjusted desired torque by the compensation torque, decrease the adjusted desired torque by the compensation torque.

* * * * *